July 1, 1930.
C. W. AIKEN
1,768,533
SEPARATOR
Filed Aug. 16, 1926
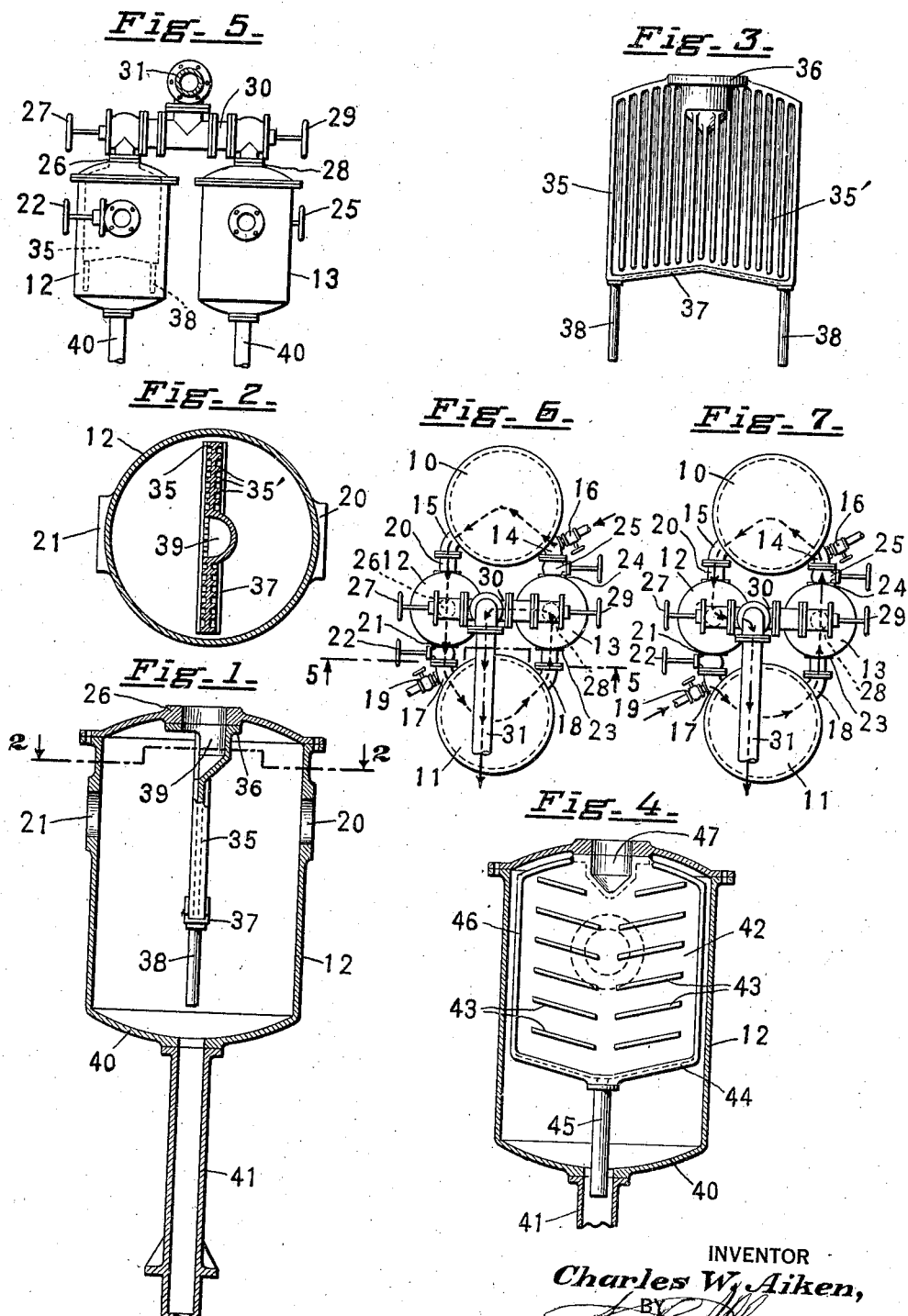

Patented July 1, 1930

1,768,533

UNITED STATES PATENT OFFICE

CHARLES W. AIKEN, OF FRANKLIN, NEW HAMPSHIRE

SEPARATOR

Application filed August 16, 1926. Serial No. 129,338.

My invention relates particularly to separators for use with double effect evaporators which are run reversing or to use with evaporators handling any foamy material as in the recovery of glycerine from waste lyes produced in the manufacture of soap.

This application is a partial continuation of my former application filed May 17, 1923, #639,672 now Patent #1,600,784. The principal subject matter of the present application is divided out of said former case and I have also shown in Fig. 4 a modification of the separator.

The main object of my invention is to provide a simple, reliable and efficient separator or catchall as it is sometimes called.

A specific object is to provide a simple construction adapted for use in evaporator systems. Another object is to provide separators adapted to be interchangeably used in the system disclosed in the above mentioned application, in which steam may be twice used. Another specific object is to provide separators adapted for use in evaporator systems, employing a reverse flow of the steam.

Fig. 1 is a vertical sectional view of one of the separators embodying the improvements of my invention.

Fig. 2 is a horizontal sectional view of the separator on the plane of the line 2—2 of Fig. 1.

Fig. 3 is a side view of a preferred form of a baffle drain for the separator.

Fig. 4 is a vertical section and side view showing a modified form of baffle drain in position in one of the separators. (Shown sectionally.)

Fig. 5 is a vertical projection showing two of my separators connected together for use in a reverse flow evaporator system. This view is a section on the plane of 5—5 Fig. 6.

Fig. 6 is a more or less diagrammatic plan view of the apparatus of Fig. 5 indicating by arrows the flow of the steam in one direction.

Fig. 7 is a similar view showing the reverse direction of flow.

As the separator embodying my invention is for use in systems of glycerine recovery I shall also refer to one form of evaporator apparatus with which it may be used.

The evaporators 10 and 11 may be of any suitable type adapted to be filled and emptied in any suitable manner. The separators 12 and 13 will be described later. Each evaporator has a steam inlet and an outlet near the top as at 14 and 15 respectively. The admission of steam is controlled by a valve 16. Evaporator 11 has an inlet 17 and an outlet 18. The admission of steam is controlled by the valve 19.

The separator 12 has an inlet 20 and outlet 21. The outlet is controlled by a valve 22. The separator 13 has an inlet 23 and an outlet 24, the latter being controlled by a valve 25. The separator 12 has a supplemental outlet which is preferably arranged in the top or cover 26 and the flow from this outlet is controlled by the valve 27. The outlet from the top 28 of the other separator 13 is controlled by a valve 29. For convenience in construction, installation, and control, I prefer to have the outlets discharge through a connecting conduit 30 and an outlet conduit 31, which is connected to a suitable vacuum pump (not shown).

Each separator is preferably provided with a baffle plate 35 which may be provided with a collar 36 for convenient attachment to the inside of the cover 26. This baffle plate is preferably provided with ribs or corrugations 35' at the edges and on its surface and a drainage trough 37 at the bottom leading to the outlet pipes 38—38. Preferably the baffle plate 35 is so constructed and arranged that the steam which enters through the inlet 20 must pass around the edges of the baffle plate in order to escape through the outlet 21. The baffle is also so constructed as to permit of the escape of steam from the rear of the baffle plate only, through the passage 39 to the outlet in the top 26.

Liquid which is carried over with the steam into the separator collects on the plate 35 and drains down into the bottom 40 of the separator and through the pipe 41 into one or the other of the evaporators. By having the drip from the baffle carried into the bottom of the tank out of the path of the direct steam flow, it is less likely to be picked up by the steam.

With the valves 16, 22 and 29 open and the valves 25, 27 and 19 closed, the flow of steam is through the various receptacles in the order indicated by the dotted arrows in Figure 6, namely through the evaporator 10, separator 12, evaporator 11, separator 13, and thence from pipes 30 and 31 to the usual pump (not shown).

With the valves 19, 25 and 27 open and the valves 16, 22 and 29 closed, the flow of steam is in the direction indicated by the dotted arrows in Figure 7, namely through the valve 19, evaporator 11, separator 13, evaporator 10, separator 12, and thence outward through pipes 30 and 31.

An alternative form of baffle drain for use in the separators is shown in Fig. 4, in position for use. This modification consists of a metallic plate 42 having inclined projecting or protuberant ridges of baffles 43 and an inclined flangelike trough 44 adapted to guide the descending fluid into a central drain pipe 45 which in turn discharges into the outlet pipe 41. Ribs or flanges 46 at the edges are also desirable to assist in trapping the liquid which is entrained by the steam. A passage 47, similar to passage 39 of baffle drain 35, is provided for the upward escape of steam in the rear of the baffle drain 42.

By the construction and arrangement shown it is possible to utilize the maximum capacity of the apparatus to the greatest advantage and by reversing the direction of the flow from time to time to keep the apparatus from fouling.

The separator is simple in construction and easy to install or remove as necessity may require.

I claim:—

1. Apparatus of the character described comprising a separator tank having an inlet at one side and an outlet at the other side, said tank also having an outlet at the top and a drain outlet at the bottom, a baffle plate mounted transversely in said tank and extending vertically beneath the outlet in the top and having vertical ridges on its opposite sides and an inclined drain at its lower edge and a drain pipe secured to the lowest part of said drain.

2. Apparatus of the character described comprising a separator having an inlet at one side and an outlet at the top and a baffle plate arranged to cross the separator leaving spaces around the side edges and around the bottom, said baffle plate having at its side opposite the inlet and at its upper end an outlet to register with the outlet at the top of the separator.

3. Apparatus of the character described comprising a separator having a lateral inlet and a detachable cover with an outlet, and a baffle plate secured to said cover and having on the side opposite said inlet an outlet registering with the outlet in the cover.

4. A separator of the character described comprising a separator tank having an inlet at one side and an outlet at the other side, said tank also having an outlet at the top between said inlet and outlet and a drain outlet at the bottom, a baffle plate mounted transversely in the upper part of said tank and extending downwardly beneath and at one side of the outlet in the top and having side flanges and having drain trough at its lower edge and a drain pipe connected to said trough and discharging into the lower part of said tank well below the side openings.

5. Separator apparatus of the character described comprising a tank having openings in its upper side walls, one constituting an inlet and the other an outlet, said tank also having an auxiliary outlet at the top and a drain outlet at the bottom, a baffle plate extending transversely of said tank between the openings, said baffle plate having on its opposite sides marginal and spaced ridges, said baffle plate also having an inclined trough at the lower edges and a vertical pipe for draining liquid from said baffle plate into said drain outlet of said separator tank.

6. A separator comprising a casing having an inlet at one side, an outlet at the opposite side and an auxiliary outlet and an elongated drain outlet at the bottom, a baffle plate supported between the side inlet and side outlet to intercept liquid from the inlet and a drip pipe extending from the bottom of the baffle plate to a point near the bottom of the casing.

7. A separator comprising a casing having a detachable cover with an outlet, and having inlet and outlet openings on opposite sides, a baffle plate secured to and removable with the cover and extending down into the casing between the side inlet and outlet openings, and having its edges spaced apart from the sides of the casing to leave passages.

CHARLES W. AIKEN.